(12) United States Patent
Liaw et al.

(10) Patent No.: US 9,446,400 B2
(45) Date of Patent: Sep. 20, 2016

(54) ALCOHOL-SOLUBLE CONJUGATED POLYMER AND USE THEREOF

(71) Applicant: National Taiwan University of Science and Technology, Taipei (TW)

(72) Inventors: Der-Jang Liaw, Taipei (TW); Yian Tai, Taipei (TW); Jyh-Chiang Jiang, Taipei (TW)

(73) Assignee: NATIONAL TAIWAN UNIVERSITY OF SCIENCE AND TECHNOLOGY, Taipei (TW)

( * ) Notice: Subject to any disclaimer, the term of this patent is extended or adjusted under 35 U.S.C. 154(b) by 0 days.

(21) Appl. No.: 14/748,247

(22) Filed: Jun. 24, 2015

(65) Prior Publication Data

US 2016/0002392 A1 Jan. 7, 2016

(30) Foreign Application Priority Data

Jul. 2, 2014 (TW) .............................. 103122871 A

(51) Int. Cl.
  C08G 75/00 (2006.01)
  B01J 41/12 (2006.01)
  C08G 61/12 (2006.01)
(52) U.S. Cl.
  CPC ............ *B01J 41/125* (2013.01); *C08G 61/126* (2013.01); *C08G 2261/143* (2013.01);
(58) Field of Classification Search
  CPC .................. H01L 51/0039; C08G 2261/3162; C08G 2261/143; C08G 2261/411; C08G 2261/18; C08G 2261/95; C08G 2261/3142; C08G 2261/1434; C08G 2261/512; C08G 2261/91
  USPC .......................................................... 528/422
  See application file for complete search history.

(56) References Cited

U.S. PATENT DOCUMENTS 8,304,514 B2 11/2012 Liaw
2012/0217490 A1 8/2012 Towns et al.

FOREIGN PATENT DOCUMENTS

| CN | 101847693 A | 9/2010 |
| TW | 200624534 | 7/2006 |
| TW | 201202196 A1 | 1/2012 |
| TW | 201204762 A1 | 2/2012 |
| WO | 2012/059215 A1 | 5/2012 |

OTHER PUBLICATIONS

Wen-Hsiang Chen et al., "Novel Triarylamine-Based Alternating Conjugated Polymer with High Hole Mobility: Synthesis, Electro-Optical, and Electronic Properties", Journal of Polymer Science: Part A: Polymer Chemistry, vol. 48, 4654-4667 (2010) VC 2010 Wiley Periodicals, Inc., Published online Sep. 7, 2010.

Takahiro Fukumatsu et al., "Charge Carrier Mobilities in Amorphous Triphenylamine-Fluorene Copolymers: Role of Triphenylamine Unit in Intra- and Intermolecular Charge Transport", 2012 Appl. Phys. Express 5 (2012) 061701, Published online May 22, 2012.

*Primary Examiner* — Shane Fang
(74) *Attorney, Agent, or Firm* — CKC & Partners Co., Ltd.

(57) ABSTRACT

A conjugated polymer is provided, having a structure of formula (I):

in formula (I), n is an integer greater than 10, wherein (i) $R_1$ is

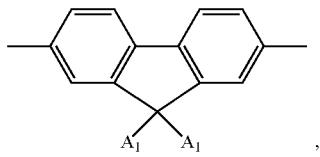

$R_2$ is

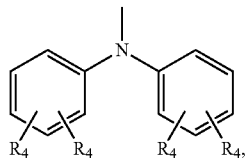

wherein $A_1$ is a functional group having a tertiary amine group or a quaternary ammonium salt group, $R_4$ is independently selected from hydrogen, fluorine, alkyl, alkoxy, fluoroalkyl, or fluoroalkoxy, or (ii) $R_1$ is

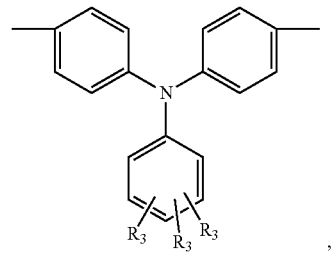

$R_2$ is $A_2$, wherein $R_3$ is independently selected from hydrogen, alkyl, fluoroalkyl, $A_2$, or

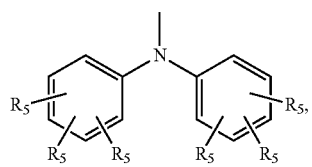

and $A_2$ is a functional group having a tertiary amine group or a quaternary ammonium salt group, wherein $R_5$ is independently selected from hydrogen, alkyl, alkoxy, or fluoroalkyl.

4 Claims, 6 Drawing Sheets

ALCOHOL-SOLUBLE CONJUGATED POLYMER AND USE THEREOF

RELATED APPLICATIONS

This application claims priority to Taiwan Application Serial Number 103122871, filed Jul. 2, 2014, which is herein incorporated by reference.

BACKGROUND

1. Field of Invention

The present invention relates to a conjugated polymer. More particularly, the present invention relates to a conjugated polymer with side chains of a tertiary amine group or a quaternary ammonium salt group.

2. Description of Related Art

Organic electronic devices has become increasingly important in the relative field due to its advantages of simple process, cheap, thin, light, and capable of large area manufacturing. However, limited to the properties of the organic material itself, the performance of the current organic electronic devices are still lower than silicon-including compound or other inorganic material based electronic devices. The main reason is that the movements of electrons and holes in the organic material are different from that in the inorganic material, which leads the charge mobility of the organic electronic devices to be lower than that of the inorganic electronic devices, and thereby affecting the overall performance of the organic electronic devices.

In order to solve the above problems, a hole transport layer and an electron transport layer are usually required to be added into the structure of the organic electronic device to facilitate the transportation of the charges. The properties of the hole transport layer and electron transport layer deeply affect the overall performance of the organic electronic device. PEDOT:PSS is a conducting polymer, and is usually used as a hole-transporting material. However, PEDOT:PSS is a strong acid, which is corrosive to the electrode and active layer. Therefore, PEDOT:PSS is not an ideal hole-transporting material.

Further, most solvents used for each layer of the organic electronic device are miscible, and therefore there are problems of mutual dissolution between different layers while fabricating a multi-layered structure solar cell device by solution process. For instance, when fabricating a second layered structure over a first layered structure of an organic electronic device, the solvent for the second layered structure would dissolve and damage the first layered structure.

Accordingly, there is a need for a material being neutral and water/alcohol soluble, and having a good hole-transporting property to solve the abovementioned problems.

SUMMARY

An aspect of the present invention provides a conjugated polymer having a structure of formula (I):

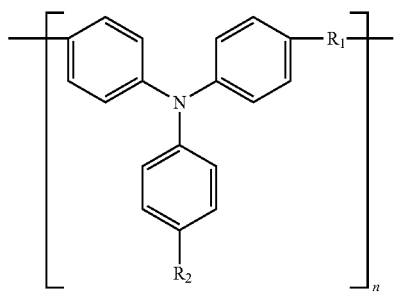

in formula (I), n is an integer greater than 10, wherein (i) $R_1$ is

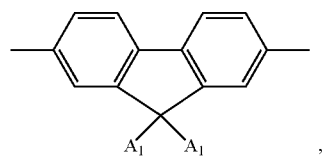

$R_2$ is

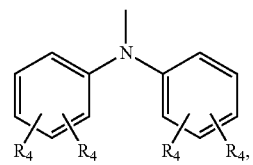

wherein $A_1$ is a functional group having a tertiary amine group or a quaternary ammonium salt group, and $R_4$ is independently selected from hydrogen, fluorine, alkyl, alkoxy, fluoroalkyl, or fluoroalkoxy, or (ii) $R_1$ is

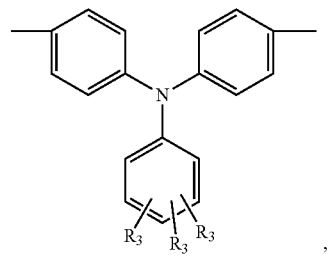

$R_2$ is $A_2$, wherein $R_3$ is independently selected from hydrogen, alkyl, fluoroalkyl, $A_2$, or

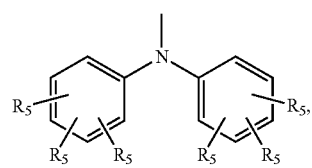

and $A_2$ is a functional group having a tertiary amine group or a quaternary ammonium salt group, wherein $R_5$ is independently selected from hydrogen, alkyl, alkoxy, or fluoroalkyl.

According to an embodiment of the present invention, $R_4$ is independently selected from hydrogen, fluorine, alkyl of 1-12 carbon atoms, alkoxy of 1-12 carbon atoms, fluoroalkyl of 1-12 carbon atoms, or fluoroalkoxy of 1-12 carbon atoms.

According to an embodiment of the present invention, when $A_1$ is the tertiary amine group, $A_1$ is $-C_aH_{2a}N(CH_3)_2$ or

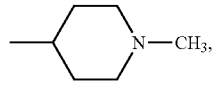

and a is 2 or 3.

According to an embodiment of the present invention, when $A_1$ is the quaternary ammonium salt group, $A_1$ is

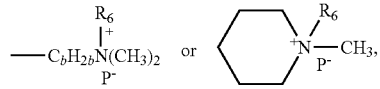

and b is 2 or 3, $P^-$ is $Cl^-$, $Br^-$, $I^-$, or $CH_3SO_3^-$, and $R_6$ is $-C_cH_{2c+1}$, wherein c is an integer greater than or equal to 1.

According to an embodiment of the present invention, $R_3$ is independently selected from hydrogen, methyl, isopropyl, tert-butyl, trifluoromethyl, $A_2$, or

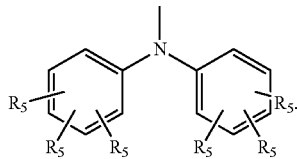

According to an embodiment of the present invention, when $A_2$ is the tertiary amine group, $A_2$ is

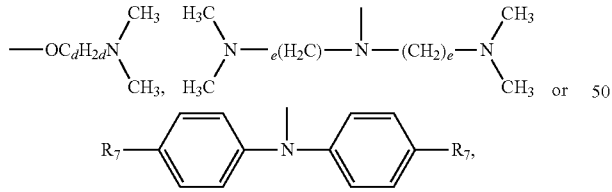

wherein d is an integer greater than or equal to 2, e is 2 or 3, and $R_7$ is independently selected from

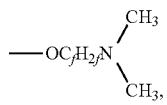

wherein f is 2 or 3.

According to an embodiment of the present invention, when $A_2$ is the quaternary ammonium salt group, $A_2$ is

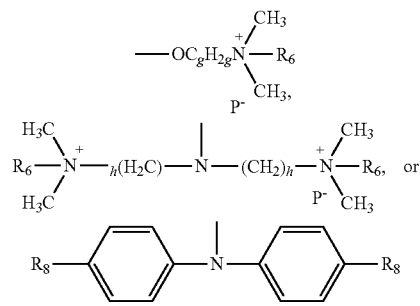

wherein g is an integer greater than or equal to 2, h is 2 or 3, and $R_8$ is independently selected from

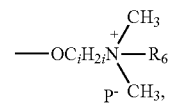

wherein i is an integer greater than or equal to 2, $P^-$ is $Cl^-$, $Br^-$, $I^-$, or $CH_3SO_3^-$, and $R_6$ is $-C_cH_{2c+1}$, wherein c is an integer greater than or equal to 1.

Another aspect of the present invention provides a hole-transporting material, including a conjugated polymer having a structure of formula (I):

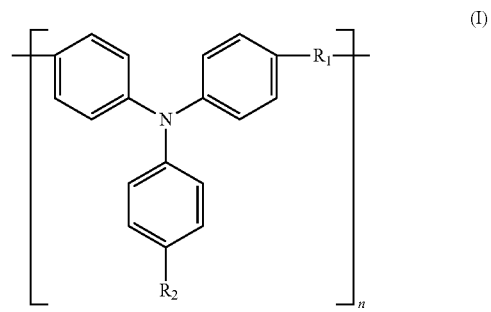

in formula (I), n is an integer greater than 10, wherein (i) $R_1$ is

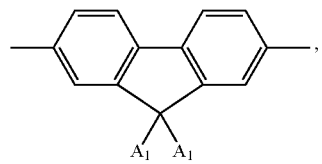

$R_2$ is

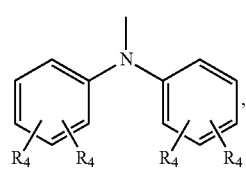

wherein $A_1$ is $-C_aH_{2a}N(CH_3)_2$ or

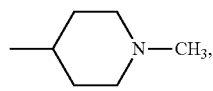

a is 2 or 3, and $R_4$ is independently selected from hydrogen, fluorine, alkyl of 1-12 carbon atoms, alkoxy of 1-12 carbon atoms, fluoroalkyl of 1-12 carbon atoms, or fluoroalkoxy of 1-12 carbon atoms, or (ii) $R_1$ is

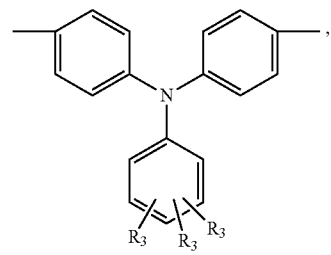

$R_2$ is $A_2$, wherein $R_3$ is independently selected from hydrogen, methyl, isopropyl, tert-butyl, trifluoromethyl, $A_2$, or

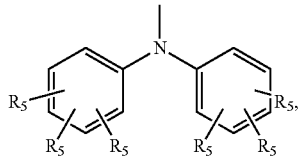

and $A_2$ is

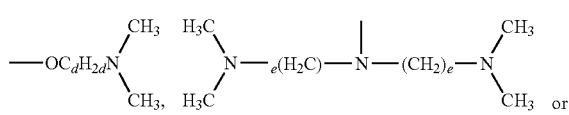

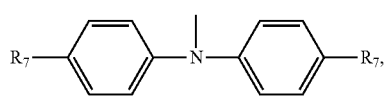

wherein d is an integer greater than or equal to 2, e is 2 or 3, and $R_7$ is independently selected from

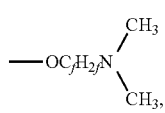

wherein f is 2 or 3, wherein $R_5$ is independently selected from hydrogen, alkyl, alkoxy, or fluoroalkyl.

Yet another aspect of the present invention provides a solid electrolyte material, including a conjugated polymer having a structure of formula (I):

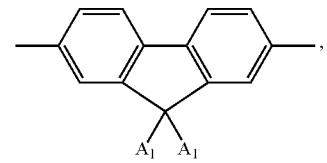

in formula (I), n is an integer greater than 10, wherein (i) $R_1$ is

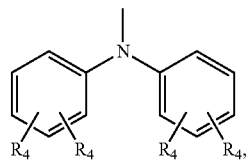

$R_2$ is

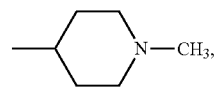

wherein $A_1$ is $-C_aH_{2a}N(CH_3)_2$ or

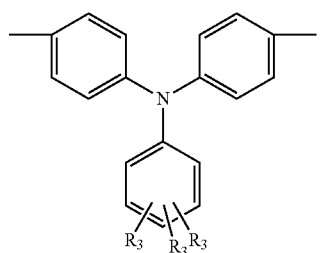

a is 2 or 3, and $R_4$ is independently selected from hydrogen, fluorine, alkyl of 1-12 carbon atoms, alkoxy of 1-12 carbon atoms, fluoroalkyl of 1-12 carbon atoms, or fluoroalkoxy of 1-12 carbon atoms, or (ii) $R_1$ is $R_2$ is $A_2$, wherein $R_3$ is independently selected from hydrogen, methyl, isopropyl, tert-butyl, trifluoromethyl, $A_2$, or

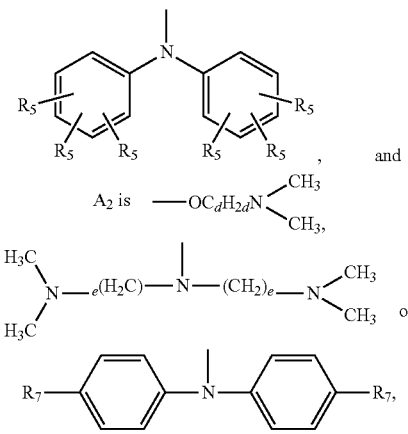

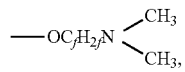

and $A_2$ is —$OC_dH_{2d}N(CH_3)_2$, $H_3C$—$N(CH_3)$—$_e(H_2C)$—$N(CH_3)$—$(CH_2)_e$—$N(CH_3)_2$ or

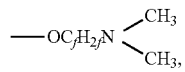

wherein d is an integer greater than or equal to 2, e is 2 or 3, and $R_7$ is independently selected from —$OC_fH_{2f}N(CH_3)_2$, wherein f is 2 or 3, wherein $R_5$ is independently selected from hydrogen, alkyl, alkoxy, or fluoroalkyl.

The conjugated polymer of the present invention includes side chains of the tertiary amine group or the quaternary ammonium salt group. When including the side chains of the tertiary amine group, the conjugated polymer of the present invention a good hole-transporting property and water/alcohol-soluble property, and can be used as a hole-transporting material or a solid electrolyte.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
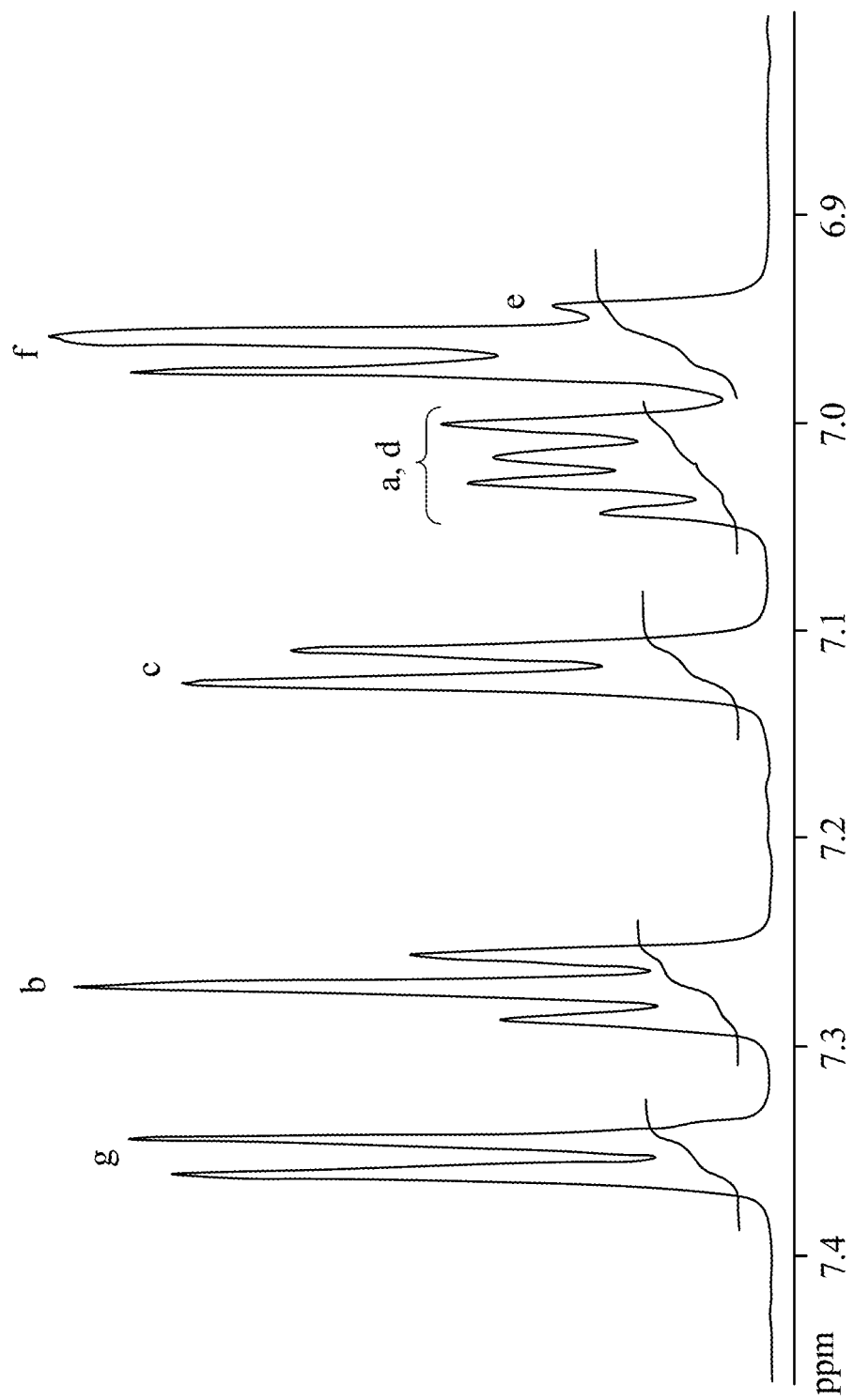
FIGS. 1A and 1B are $^1$H and $^{13}$C nuclear magnetic resonance (NMR) analysis results of an intermediate product of an embodiment of the present invention respectively.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples. Therefore, the spirit and scope of the appended claims should not be limited to the description of the embodiments contained herein.

A conjugated polymer is provided, which has a structure of formula (I):

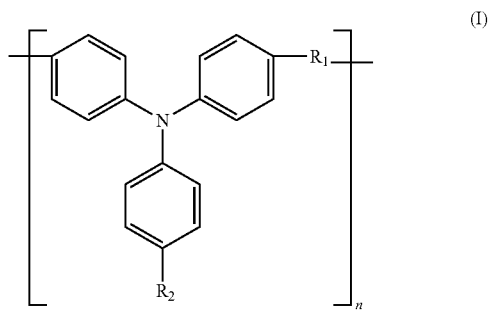

(I)

in formula (I), n is an integer greater than 10, wherein (i) $R_1$ is

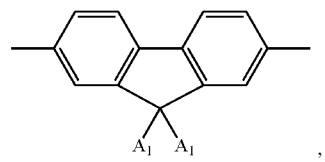

$R_2$ is

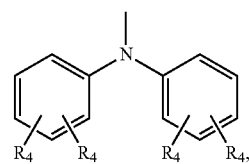

wherein $A_1$ is a functional group having a tertiary amine group or a quaternary ammonium salt group, and $R_4$ is independently selected from hydrogen, fluorine, alkyl, alkoxy, fluoroalkyl, or fluoroalkoxy, or (ii) $R_1$ is

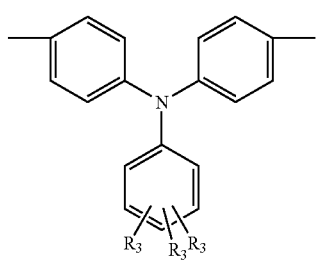

$R_2$ is $A_2$, wherein $R_3$ is independently selected from hydrogen, alkyl, fluoroalkyl, $A_2$, or

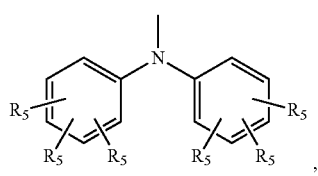

and $A_2$ is a functional group having a tertiary amine group or a quaternary ammonium salt group, wherein $R_5$ is independently selected from hydrogen, alkyl, alkoxy, or fluoroalkyl.

It is noteworthy that the fluoroalkyl and the fluoroalkoxy used in the presents invention represent that the hydrogen of alkyl and alkoxy are partially or completely replaced by fluorine respectively.

According to an embodiment of the present invention, $R_4$ is independently selected from hydrogen, fluorine, alkyl of 1-12 carbon atoms, alkoxy of 1-12 carbon atoms, fluoroalkyl of 1-12 carbon atoms, or fluoroalkoxy of 1-12 carbon atoms.

According to an embodiment of the present invention, when $A_1$ is the tertiary amine group, $A_1$ is $-C_aH_{2a}N(CH_3)_2$ or

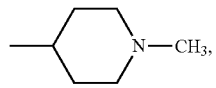

and a is 2 or 3.

According to an embodiment of the present invention, when $A_1$ is the quaternary ammonium salt group, $A_1$ is

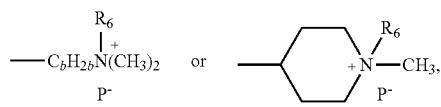

and b is 2 or 3, $P^-$, $Br^-$, $I^-$, or $CH_3SO_3^-$, and $R_6$ is $-C_cH_{2c+1}$, wherein c is an integer greater than or equal to 1.

According to an embodiment of the present invention, $R_3$ is independently selected from hydrogen, methyl, isopropyl, tert-butyl, trifluoromethyl, $A_2$, or

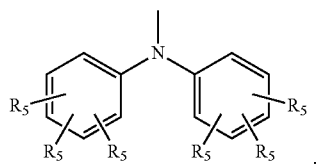

According to an embodiment of the present invention, when $A_2$ is the tertiary amine group, $A_2$ is

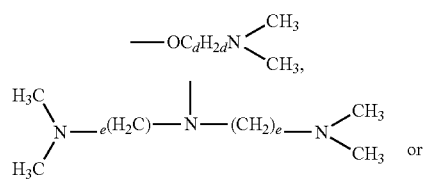

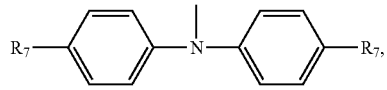

wherein d is an integer greater than or equal to 2, e is 2 or 3, and $R_7$ is independently selected from

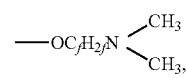

wherein f is 2 or 3.

According to an embodiment of the present invention, when $A_2$ is the quaternary ammonium salt group, $A_2$ is

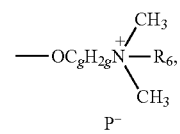

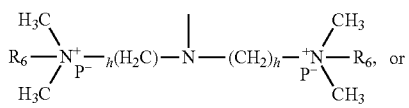

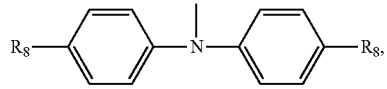

wherein g is an integer greater than or equal to 2, h is 2 or 3, and $R_8$ is independently selected from

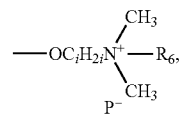

wherein i is an integer greater than or equal to 2, $P^-$ is $Cl^-$, $Br^-$, $I^-$, or $CH_3SO_3$, and $R_6$ is $-C_cH_{2c+1}$, wherein c is an integer greater than or equal to 1.

Preferably, when $R_1$ is

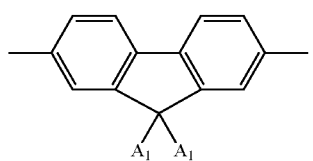

the conjugated polymer of the present invention has a structure of formula (II):

(II)
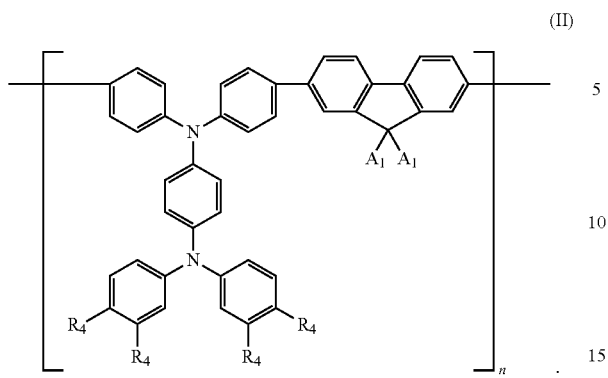
When R₁ is
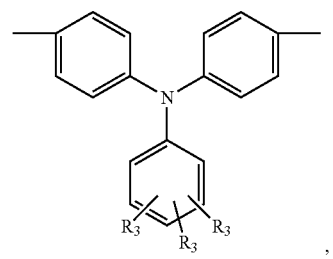
the conjugated polymer of the present invention has a structure of one of formulas (IIIa)-(IIIj):
(IIIa)
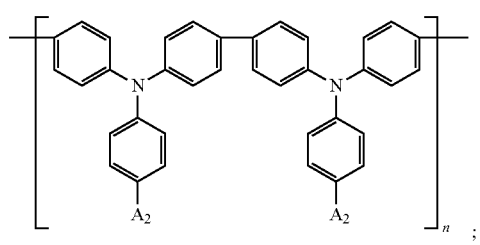
(IIIb)
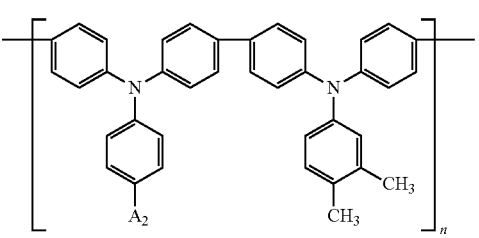
(IIIc)
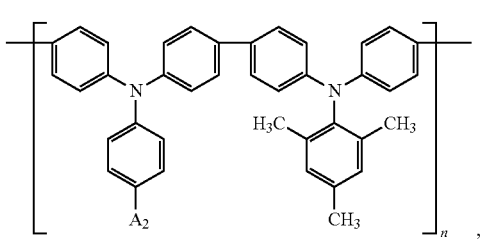
wherein (i) A₂ is
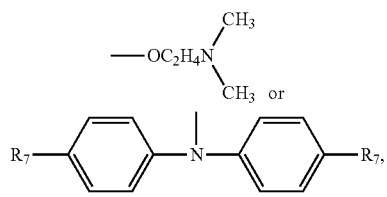
and R₇ is
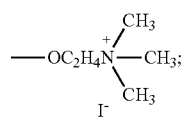
or (ii) A₂ is
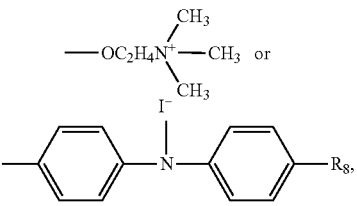
and R₈ is
(IIId)
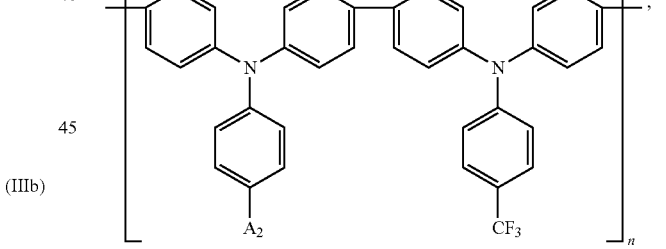
wherein (i) A₂ is
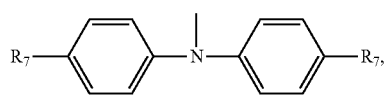
and R₇ is
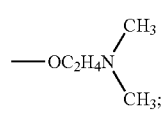

or (ii) $A_2$ is
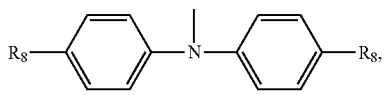
and $R_8$ is
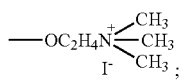
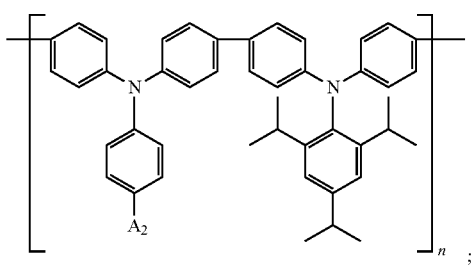
(IIIe)
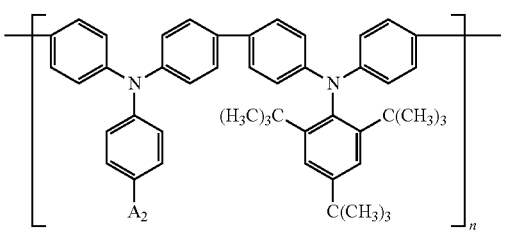
(IIIf)
wherein (i) $A_2$ is
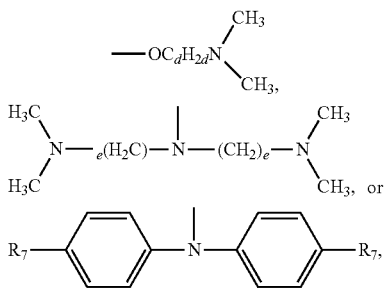
and d is 2 or 3, e is 2 or 3, $R_7$ is
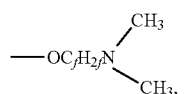
wherein f is 2 or 3; or (ii) $A_2$ is
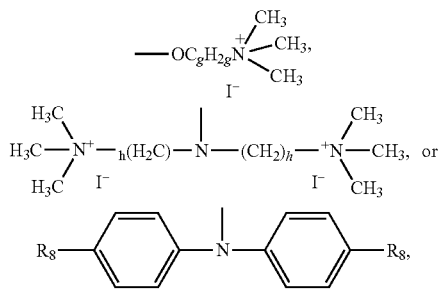
and g is 2 or 3, h is 2 or 3, $R_8$ is
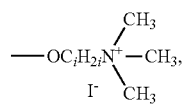
wherein i is 2 or 3;
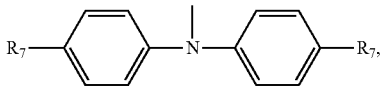
(IIIg)
wherein (i) $A_2$ is
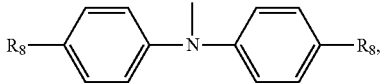
and $R_7$ is
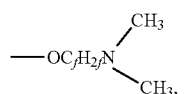
or (ii) $A_2$ is
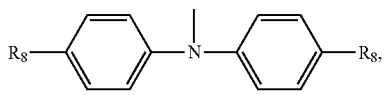

and $R_8$ is

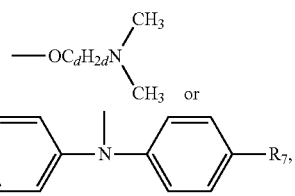

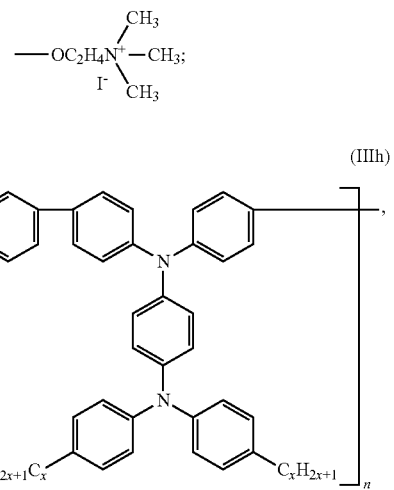
(IIIh)

wherein (i) $A_2$ is

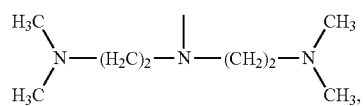

and x is an integer greater than or equal to 1;

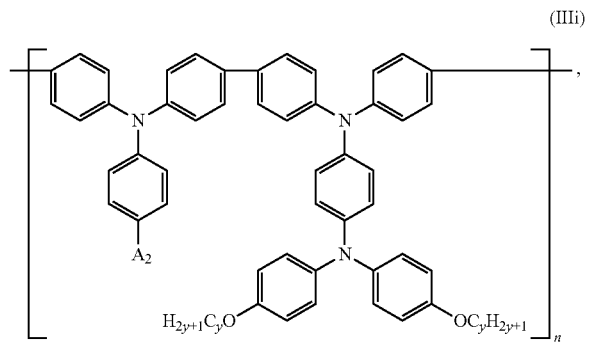
(IIIi)

wherein y is an integer greater than or equal to 1; and

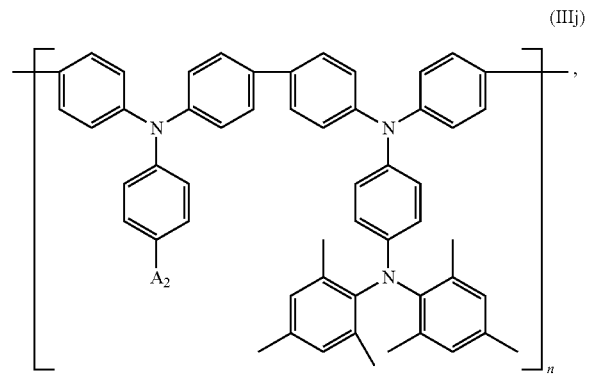
(IIIj)

wherein (i) $A_2$ is

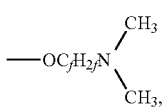

and d is 2 or 3, $R_7$ is $$—OC_fH_{2f}N\begin{smallmatrix}CH_3\\CH_3\end{smallmatrix},$$

wherein f is 2 or 3; or (ii) $A_2$ is

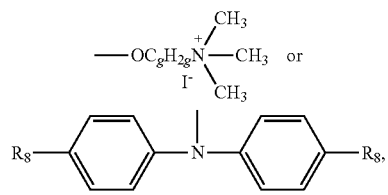

and g is 2 or 3, $R_8$ is $$—OC_iH_{2i}N^+\begin{smallmatrix}CH_3\\CH_3\end{smallmatrix}\,\,I^-\,\,CH_3,$$

wherein i is 2 or 3.

The conjugated polymer of the present invention includes side chains of the tertiary amine group or the quaternary ammonium salt group.

When the conjugated polymer includes the side chains of the tertiary amine group, i.e. $A_1$ or $A_2$ is the tertiary amine group, the tertiary amine group can react with acetic acid, and the acetic acid is soluble in alcohols. Therefore, the conjugated polymer of the present invention is soluble in alcohols under the effect of the acetic add, and thereby having good water/alcohol solubility, while common conjugated polymers are insoluble in alcohol. The solvent used for the conjugated polymer of the present invention is different from the solvent commonly used for materials of other structural layers in an organic electronic device. Hence, when fabricating a multi-layered structure, problems of mutual dissolution between different layers can be prevented due to the immiscibility between water/alcohol and the organic solvent for materials in other layers. In this embodiment, the conjugated polymer has a good hole-transporting property due to the triarylamine structure, and can be applied to (1) an organic electronic device, such as an organic solar cell, an organic light-emitting diode, an organic transistor, and an organic memory device, as a hole-transporting material; and (2) a device related to electrochemical principles, such as a traditional or inverted dye-sensitized solar cell, a lithium battery, a supercapacitor, an organic electrochromic device, and an organic photochromic device, as a solid electrolyte. Applying the conjugated polymer of the present invention to the above devices, the device performance can be significantly improved. In addition, the conjugated polymer has excellent thermal tolerance and capacities of anti physical and chemical destruction. Therefore, comparing to other hole-transporting materials, using the conjugated polymer of the present invention has a greater advantage for the life span of an organic electronic device that requires a better weathering resistance, such as an outdoor organic solar cell and an outdoor light-emitting diode for lighting. Moreover, the conjugated polymer can be used as not only a hole transport layer, but also an electron blocking layer based on the applied device. Further, the conjugated polymer of the present invention is a solid material, and has a good hole-transporting property. Hence, the conjugated polymer can replace traditional liquid electrolyte, and be applied to related device in order to avoid the problem of electrolyte leakage, and thereby significantly improve the quality of the device.

When the conjugated polymer includes the side chains of the quaternary ammonium salt group, i.e. $A_1$ or $A_2$ is the quaternary ammonium salt group, the conjugated polymer can be used as a conductive polymer to replace commonly used poly(3,4-ethylenedioxythiophene):polystyrenesulfonate (PEDOT:PSS). The conjugated polymer includes conjugated double bond structures, which the electrons of the 27: bond are free to move throughout the structure. After doping, the electrons can be removed to produce holes, or extra electrons can be added. The electrons or holes can freely move through the molecular chains so as to have a good conductive property. The conjugated polymer with the quaternary ammonium salt group cannot be dissolved by an ordinary organic solvent, while can be dissolved by a strongly polar solvent, such as water, dimethyl sulfoxide, and dimethyl formamide. Moreover, the conjugated polymer with the quaternary ammonium salt group can be used for the modification of indium tin oxide (ITO) to reduce the work function of the ITO.

The detailed description provided below is intended as a description of the present examples and is not intended to represent the only forms in which the present example may be constructed or utilized. Therefore, the spirit and scope of the appended claims should not be limited to the description of the embodiments contained herein.

Embodiment 1

Embodiment 1 of the present invention is a conjugated polymer of bis(triphenylamine) and fluorene. The method for forming Embodiment 1 included the following steps:

1. Synthesis of N,N-bis(4-bromophenyl)-N',N'-diphenyl-1,4-phenylenediamine monomer Diphenylamine, tribromotriphenylamine, palladium acetate (Pd[OAc]$_2$), 1,1'-bis(diphenylphosphino)ferrocene (DPPF), sodium tert-butoxide (t-BuO$^-$Na$^+$) and toluene were placed in a three-neck flask, which was equipped with a condenser and streamed with nitrogen. The mixture was heated to 100° C., and the reaction was continued for 12 hours. The solvent was removed by rotary evaporation, and the residue was extracted by dichloromethane (DCM) and water. The organic phase was dried over anhydrous magnesium sulfate (MgSO$_4$), and was filtered and concentrated to obtain a crude product. The crude product was purified by column chromatography to obtain N,N-bis(4-bromophenyl)-N',N'-diphenyl-1,4-phenylenediamine monomer (yield: 60%). The reaction was as follows:

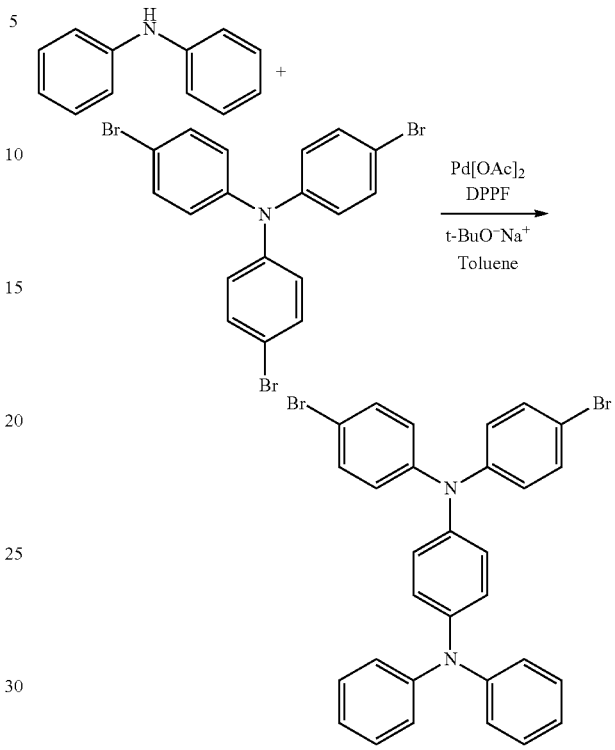

Figure 1B:
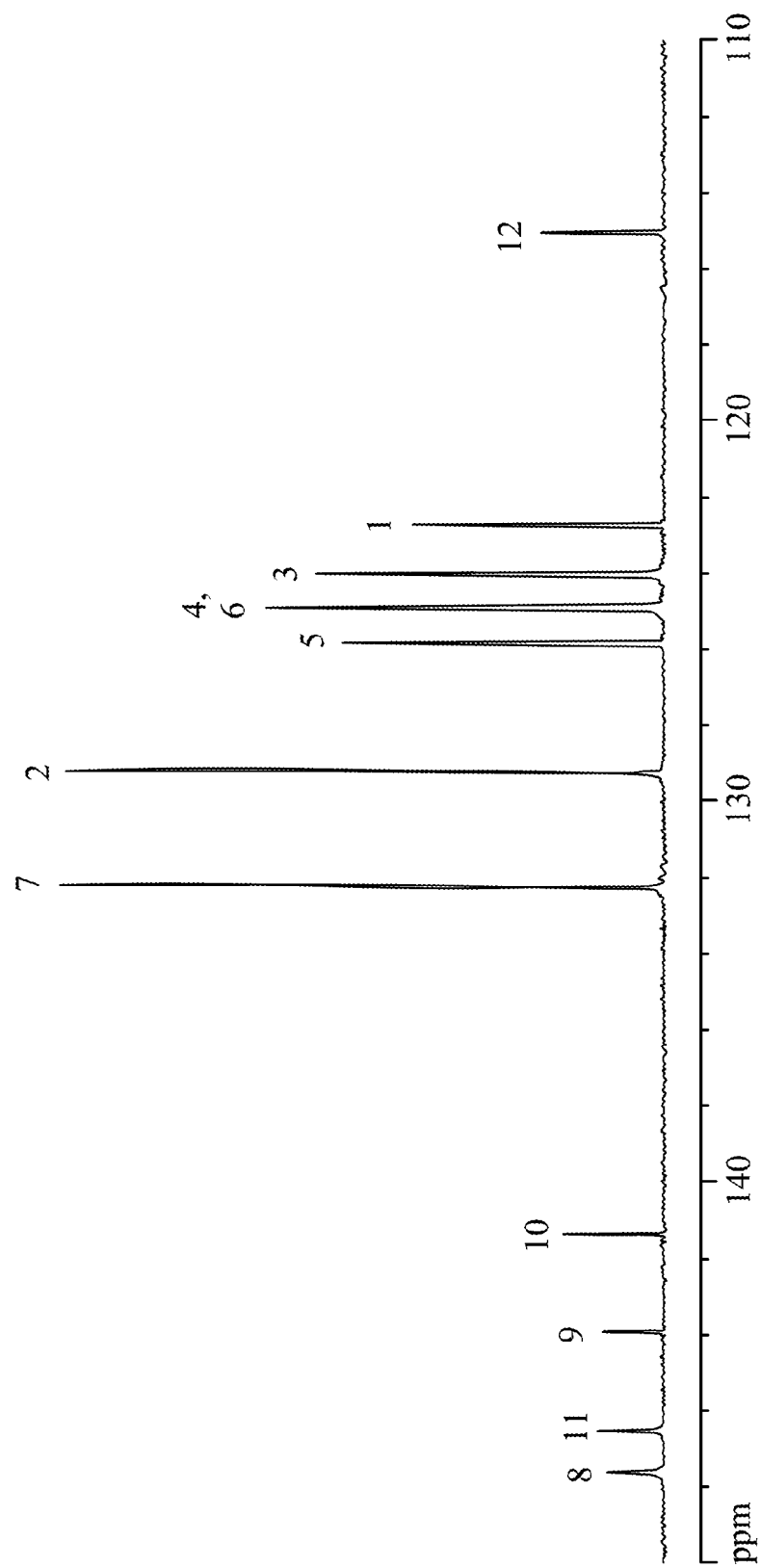

FIGS. 1A and 1B are $^1$H and $^{13}$C nuclear magnetic resonance (NMR) analysis results of the N,N-bis(4-bromophenyl)-N',N'-diphenyl-1,4-phenylenediamine monomer respectively. The obtained N,N-bis(4-bromophenyl)-N',N'-diphenyl-1,4-phenylenediamine monomer was structural analyzed by NMR spectroscopy, wherein the alphabets and numbers shown in FIGS. 1A and 1B correspond to the structure of hydrogen and carbon in the N,N-bis(4-bromophenyl)-N',N'-diphenyl-1,4-phenylenediamine monomer as follows:

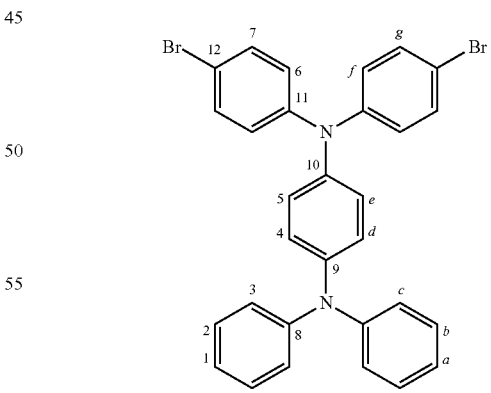

2. Synthesis of N,N-bis(4-(4,4,4,5,5,-tertamethyl-1,3,2-dioxaborolan-2-yl)phenyl)-N',N'-diphenyl-1,4-phenylenediaminea monomer N,N-bis(4-bromophenyl)-N',N'-diphenyl-1,4-phenylenediamine was dissolved in tetrahydrofuran (THF). Under the protection of nitrogen, the reaction flask was placed in liquid nitrogen, and n-butyllithium was added into the flask at low temperature.

2-Isopropoxy-4,4,5,5-tetramethyl-1,3,2-dioxaborolane was added slowly into the reaction flask, and the reaction flask was moved to room temperature and reacted for 12 hours. The reaction mixture was extracted by dichloromethane (DCM) and water. The organic phase was dried over anhydrous magnesium sulfate (MgSO$_4$), and was filtered and concentrated to obtain a crude product. The crude product was purified by column chromatography to obtain N,N-bis(4-(4,4,4,5,5,-tertamethyl-1,3,2-dioxaborolan-2-yl)phenyl)-N',N'-diphenyl-1,4-phenylenediamine monomer (yield: 40%). The reaction was as follows:

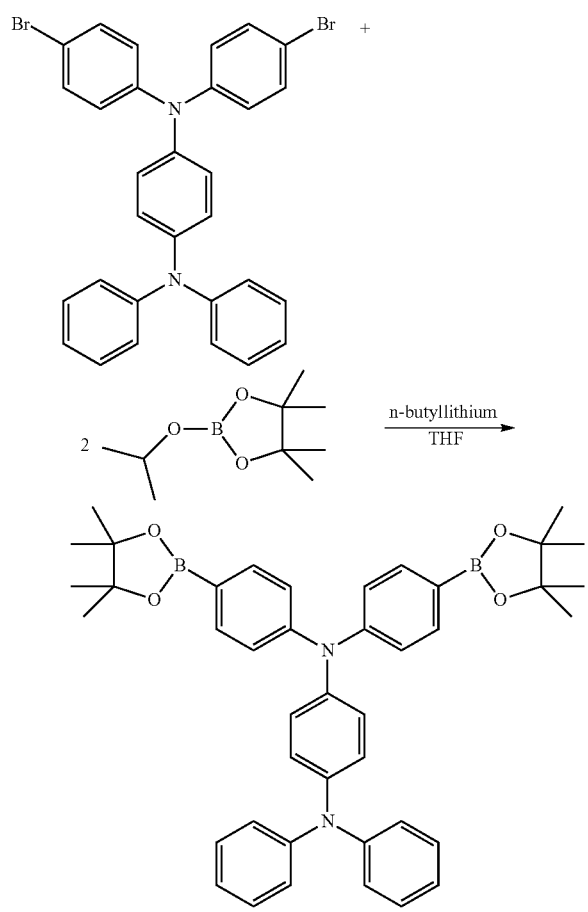

The obtained N,N-bis(4-(4,4,4,5,5,-tertamethyl-1,3,2-dioxaborolan-2-yl)phenyl)-N',N'-diphenyl-1,4-phenylenediamine monomer was structural analyzed by NMR spectroscopy ($^1$H NMR, $^{13}$C NMR), and the spectral information were as follows:

$^1$H NMR (Benzene-d$_6$): δ(ppm)=8.027-8.041 (d, 4H); 7.167-7.181 (d, 4H); 7.076-7.088 (d, 4H); 7.018-7.044 (t, 4H); 6.919 (s, 4H); 6.812-6.836 (t, 2H); 1.136 (s, 24H).

$^{13}$C NMR (Benzene-d$_6$): δ(ppm)=151.14, 148.67, 144.63, 142.70, 137.11, 129.95, 128.68, 127.30, 125.70, 124.89, 123.46, 123.32, 83.93, 25.32.

3. Synthesis of 2,7-dibromo-9,9'-bis(3'-(N,N'-dimethylamineo)propyl)fluorene monomer 2,7-Di-boromo fluorene was dissolved in adequate amount of dimethyl sulfoxide (DMSO). Under the protection of nitrogen, haloalkane with hydrophilic groups, sodium hydroxide (NaOH), tetrabutyl ammonium bromide (TBAB), and 3-dimethylaminopropylchloride hydrochloride were added into the fluorine solution. The mixture was stirred at room temperature and continuously reacted for 6 hours. After the reaction, the reaction mixture was extracted by water and ether. The organic phase was dried over anhydrous magnesium sulfate (MgSO$_4$), and was filtered and concentrated to obtain a crude product. The crude product was recrystallized with water and methanol (MeOH) to obtain 2,7-dibromo-9,9'-bis(3'-(N,N'-dimethylamineo)propyl)fluorene (yield: 90%). The reaction was as follows:

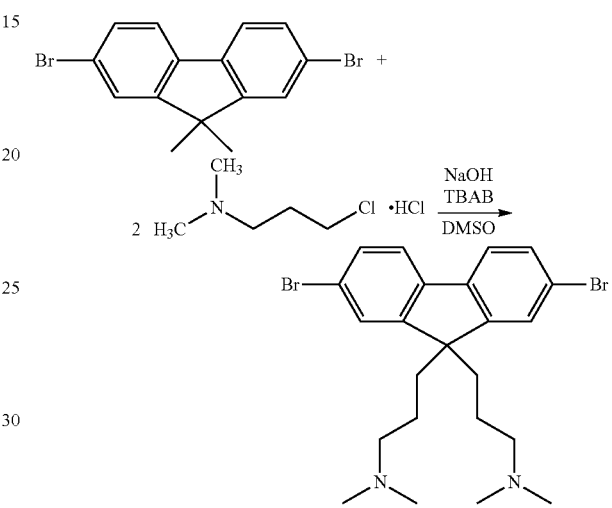

The obtained 2,7-dibromo-9,9'-bis(3'-(N,N'-dimethylamineo)propyl)fluorene was structural analyzed by NMR spectroscopy ($^1$H NMR, $^{13}$C NMR), and the spectral information were as follows:

$^1$H NMR (500 MHz, DMSO-d$_6$): δ(ppm)=7.82-7.80 (d, 2H, fluorene ring), 7.69 (s, 2H, fluorene ring), 7.56-7.53 (d, 2H, fluorine ring), 2.04-2.00 (t, 4H, —CH$_2$N), 1.92-1.88 (m, 16H, —NCH$_3$, —CH$_2$—), 0.60-0.52 (m, 4H, —CH$_2$—).

$^{13}$C NMR (100 MHz, CDCl$_3$): δ(ppm)=152.37, 139.50, 130.75, 126.51, 122.04, 121.58 (C-fluorene ring), 60.01 (—CH$_2$N), 55.70 (C9-fluorene ring), 45.78 (—NCH$_3$), 37.96 (—CH$_2$—), 22.42 (—CH$_2$—).

4. Synthesis of water/alcohol soluble conjugated polymer (DITPAFLN)

The 2,7-dibromo-9,9'-bis(3'-(N,N'-dimethylamineo)propyl)fluorene was mixed with the N,N-bis(4-(4,4,4,5,5,-tertamethyl-1,3,2-dioxaborolan-2-yl)phenyl)-N',N'-diphenyl-1,4-phenylenediamine monomer, and tetrakis(triphenylphosphane)palladium(0) (Pd[PPh$_3$]$_4$) was added into a three-neck flask, which was equipped with a condenser and a nitrogen gas pipe. Then, toluene and potassium carbonate (K$_2$CO$_3$) solution were added, and the mixture heated to 100° C. and continuously reacted for 2 days. After the reaction, the reaction mixture was extracted by water. The organic phase was condensed and precipitated by adding methanol (MeOH). After filtration and drying, Embodiment 1 (DITPAFLN) was obtained. The reaction was as follows:

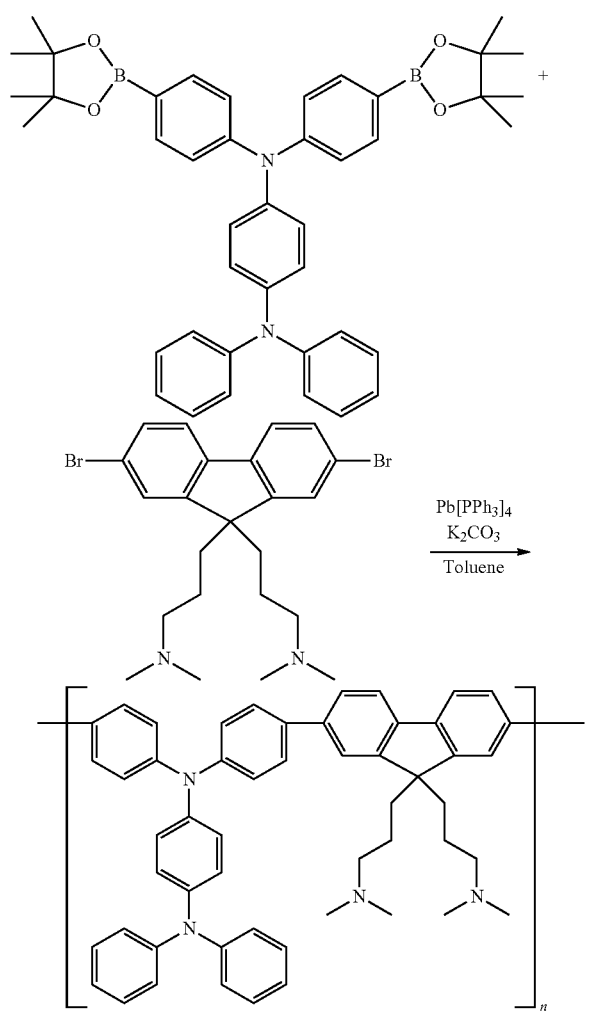

Embodiment 1 is a conjugated polymer with triphenylamine and fluorene as the backbone, and tertiary amine group as the side chains, and is water/alcohol soluble, which can prevent mutual dissolution between different organic layers. The highest occupied molecular orbital (HOMO) of Embodiment 1 was between −5.2 eV to −4.9 eV. The conjugated polymer of Embodiment 1 had a good hole-transporting property and water/alcohol-soluble property, and can be used as a hole-transporting material or a solid electrolyte. The following used a dye-sensitized solar cell/perovskite solar cell as an example, and Embodiment 1 of the present invention was used as the material of the hole transport layer in the solar cell.

Dye-Sensitized Solar Cell/Perovskite Solar Cell

Broadly, a perovskite solar cell is a kind of a dye-sensitized solar cell. However, the perovskite solar cell is regarded as a solar cell different from the dye-sensitized solar cell when narrowly defined. Therefore, based on different definitions, solar cells shown in FIGS. 2 and 3 of the present invention may be dye-sensitized solar cells or perovskite solar cells, and are represented by "dye-sensitized solar cell/perovskite solar cells" in the specification of the present invention.

Figure 2:
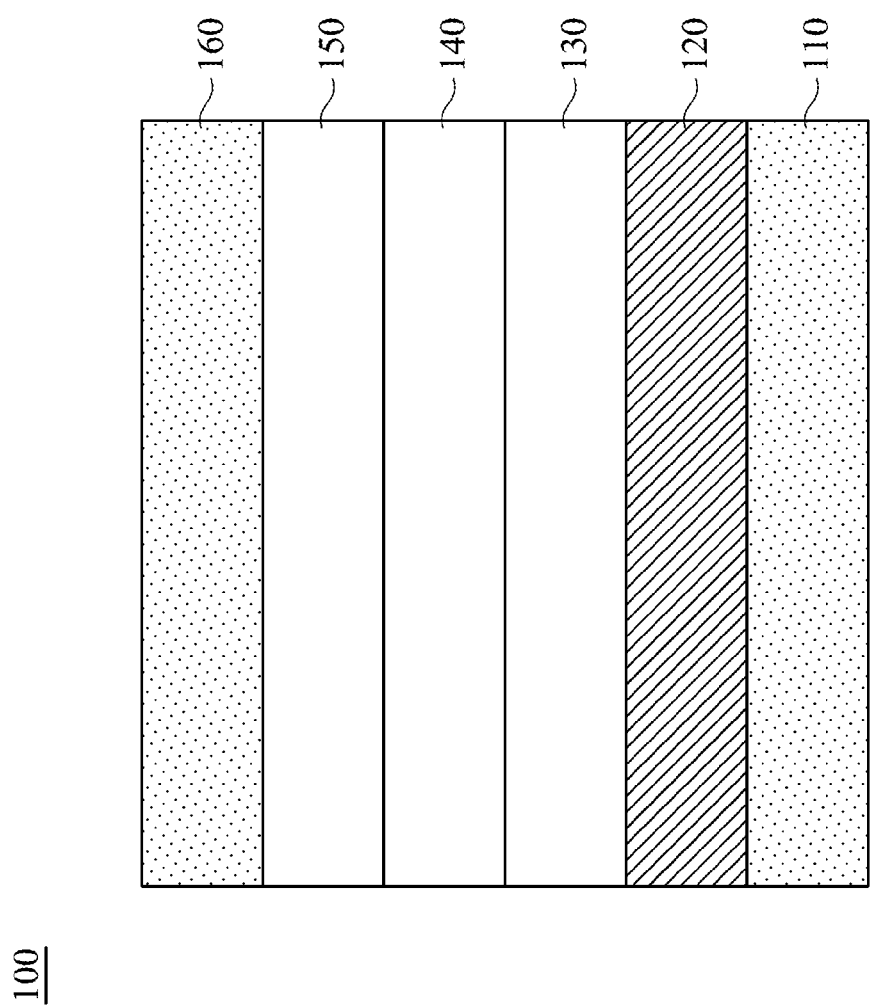
FIG. 2 is a structural schematic view of a dye-sensitized solar cell/perovskite solar cell according to an embodiment of the present invention.

FIG. 2 is a structural schematic view of a dye-sensitized solar cell/perovskite solar cell 100 according to an example of the present invention. The dye-sensitized solar cell/perovskite solar cell 100 includes a first electrode 110, a hole transport layer 120 disposed on the first electrode 110, an active layer 130 disposed on the hole transport layer 120, an electron transport layer 140 disposed on the active layer 130, a hole barrier layer 150 disposed on the electron transport layer 140, and a second electrode 160 disposed on the hole barrier layer 150. In this example, the material of the first electrode 110 was indium tin oxide (ITO); the material of the hole transport layer 120 was the conjugated polymer of Embodiment 1; the material of the active layer 130 was perovskite (Molecular formula: $CH_3NH_3PbI_3$); the material of the electron transport layer 140 was [6,6]-phenyl-C61-butyric acid methyl ester (PCBM); the material of the hole barrier layer 150 was 2,9-Dimethyl-4,7-diphenyl-1,10-phenanthroline (BCP); and the material of the second electrode 160 was aluminum.

The fabricating method of the dye-sensitized solar cell/perovskite solar cell 100 was:

1. The conjugated polymer of Embodiment 1 was spin coated on the first electrode 110 to form the hole transport layer 120.
2. Perovskite was spin coated on the hole transport layer 120 to form the active layer 130.
3. PCBM was vapor deposited on the surface of the active layer 130 to form the electron transport layer 140.
4. BCP was vapor deposited on the surface of the electron transport layer 140 to form the hole barrier layer 150.
5. Aluminum was vapor deposited on the surface of the hole barrier layer 150 to form the second electrode 160, and thereby forming the dye-sensitized solar cell/perovskite solar cell 100.

The result showed that the dye-sensitized solar cell/perovskite solar cell 100 with the conjugated polymer of Embodiment 1 as the hole-transporting material had power conversion efficiency (PCE) above 5.7%, which was higher than that of a conventional dye-sensitized solar cell with PEDOT:PSS as a hole-transporting material. The highest efficiency of the conventional dye-sensitized solar cell with PEDOT:PSS is about 3.9% as published in Adv. Mater. 2013, Vol. 25, 3727-3732. The power conversion efficiency of a solar cell represents the efficiency of the solar cell in converting sunlight into electricity.

Embodiment 2

Embodiment 2 of the present invention is a conjugated polymer of bis(triphenylamine) and fluorene with side chains of ammonium salt groups The method for forming Embodiment 2 included the following steps:

0.1 g of the conjugated polymer of Embodiment 1 (DIT-PAFLN), 30 mL of tetrahydrofuran (THF), 7.5 mL of dimethyl sulfoxide (DMSO), and 2 g of bromoethane ($C_2H_5Br$) were added into a 100 mL three-neck flask, which was equipped with a condenser and a nitrogen gas pipe. The mixture was heated to 50° C. and continuously reacted for 5 days. After the reaction, the reaction solution was distilled to remove the solvent, and precipitated by tetrahydrofuran to obtain Embodiment 2. The reaction was as follows:

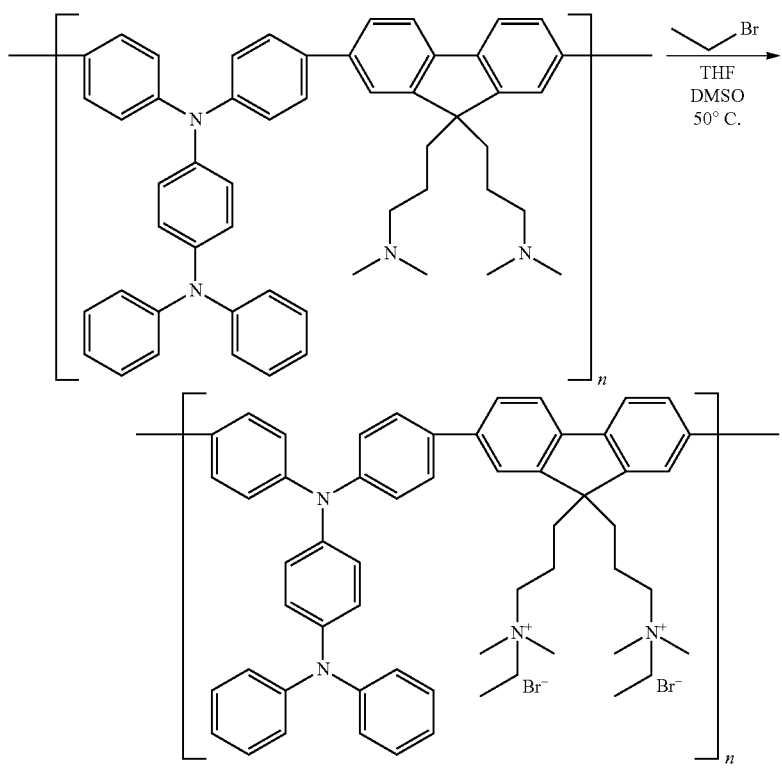

Embodiment 2 is the conjugate polymer of Embodiment 1 underwent quaternization, which makes Embodiment 2 insoluble in general organic solvents, while soluble in highly polar solvents. Embodiment 2 can be used as a conductive material to replace PEDOT:PSS. Moreover, Embodiment 2 can be used for modifying ITO to reduce the work function of ITO. The work function represents the minimum energy required to remove an electron immediately from the interior of a solid to the solid surface, and the unit is usually electron volt (eV). The following used a dye-sensitized solar cell/perovskite solar cell as an example, which utilized Embodiment 1 and Embodiment 2 of the present invention.

Dye-Sensitized Solar Cell/Perovskite Solar Cell

Figure 3:
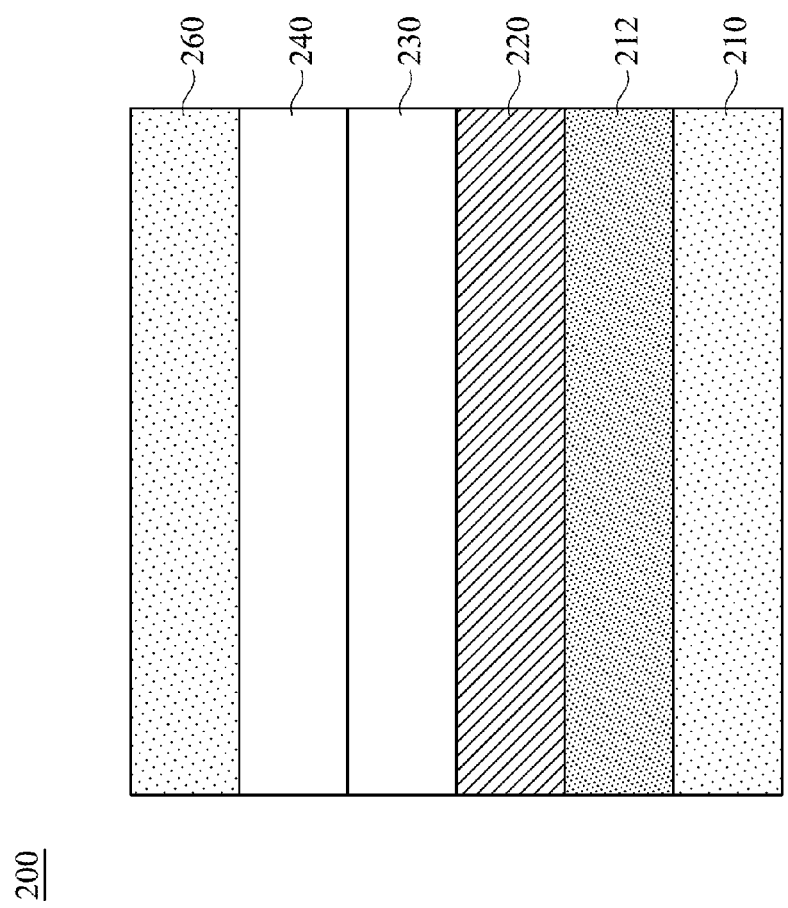
FIG. 3 is a schematic structural view of a dye-sensitized solar cell/perovskite solar cell according to another embodiment of the present invention.

FIG. 3 is a schematic structural view of a dye-sensitized solar cell/perovskite solar cell 200 according to an example of the present invention. The dye-sensitized solar cell/perovskite solar cell 200 includes a first electrode 210, a polymer salt layer 212 disposed on the first electrode 210, a hole transport layer 220 disposed on the polymer salt layer 212; an active layer 230 disposed on the hole transport layer 220, an electron transport layer 240 disposed on the active layer 230, and a second electrode 260 disposed on the electron transport layer 240. In this example, the material of the first electrode 210 was indium tin oxide (ITO); the material of the polymer salt layer 212 was the conjugated polymer of Embodiment 2, which was the salt obtained by quaternization of the conjugate polymer of Embodiment 1; the material of the hole transport layer 220 was the conjugated polymer of Embodiment 1; the material of the active layer 230 was perovskite; the material of the electron transport layer 240 was PCBM; and the material of the second electrode 260 was gold.

The fabricating method of the dye-sensitized solar cell/perovskite solar cell 200 was:

1. The conjugated polymer of Embodiment 2 was spin coated on the first electrode 210 to form the polymer salt layer 212. After the first electrode 210 modified by the conjugated polymer of Embodiment 2, the work function of ITO would be decreased from −4.7 eV to −4.1 eV.
2. The conjugated polymer of Embodiment 1 was spin coated on the polymer salt layer 212 to form the hole transport layer 220. In this example, the conjugated polymer of Embodiment 1 was used as both hole transport layer and electron blocking layer.
3. Perovskite was spin coated on the hole transport layer 220 to form the active layer 230.
4. PCBM was vapor deposited on the surface of the active layer 230 to form the electron transport layer 240.
5. Gold was vapor deposited on the surface of the electron transport layer 240 to form the second electrode 260, and thereby forming the dye-sensitized solar cell/perovskite solar cell 200.

Figure 4:
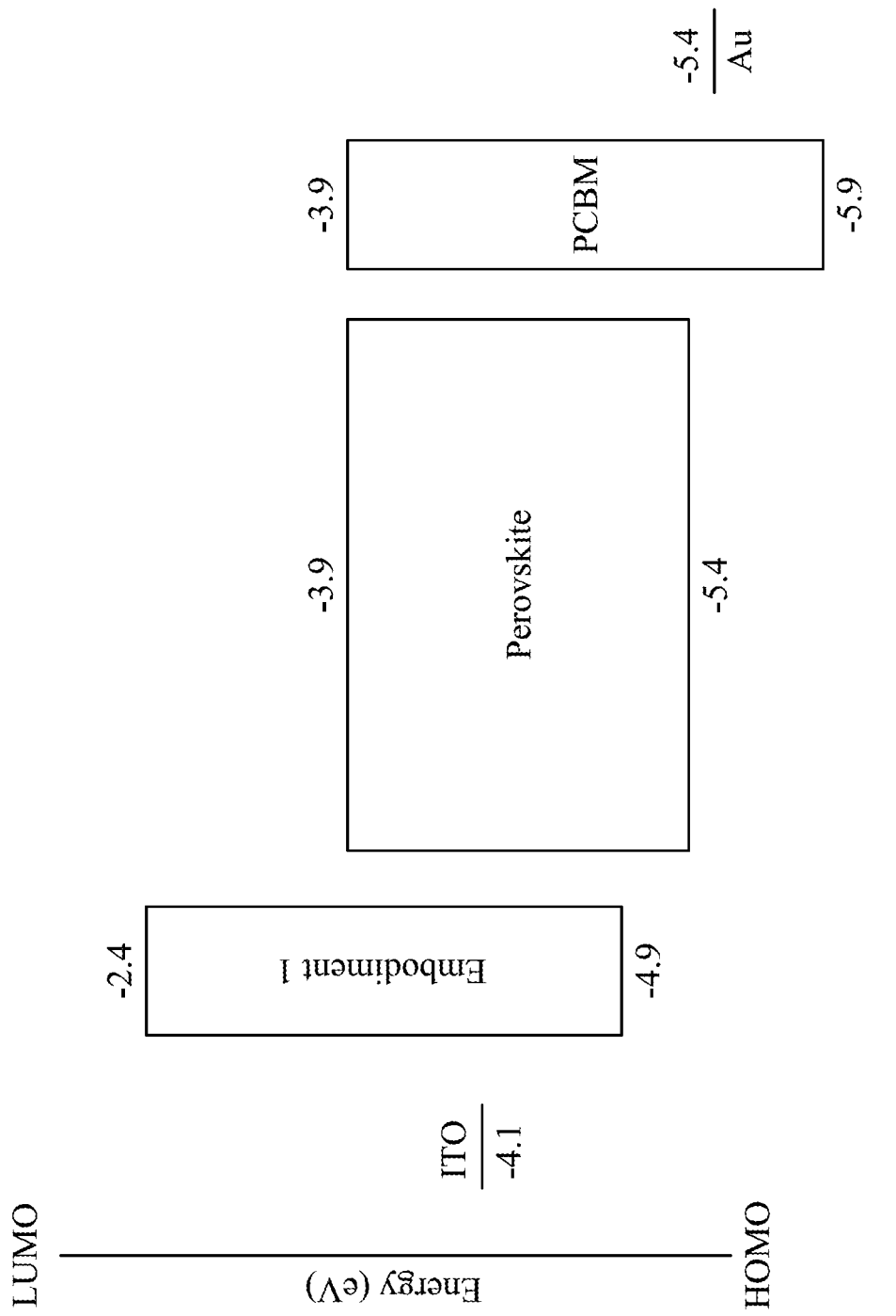
FIG. 4 is a schematic energy level diagram of the dye-sensitized solar cell/perovskite solar cell in FIG. 3.

FIG. 4 is a schematic energy level diagram of the dye-sensitized solar cell/perovskite solar cell 200 applying Embodiment 1 and Embodiment 2 of the present invention. FIG. 4 shows the work function, HOMO, and LUMO of each layer in the dye-sensitized solar cell/perovskite solar cell 200. HOMO (Highest occupied molecular orbital) represents the highest-energy orbital of the molecular orbital occupied by electrons, while LUMO (Lowest unoccupied molecular orbital) represents the lowest-energy orbital of the molecular orbital not occupied by electrons. As shown in FIG. 4, the work function of ITO was −4.1 eV, which means that after modified by the conjugated polymer of Embodiment 2, the work function of ITO can be effectively reduced.

The following used an organic light-emitting diode as an example, which utilized Embodiment 1 and Embodiment 2 of the present invention.

Organic Light-Emitting Diode

Figure 5:
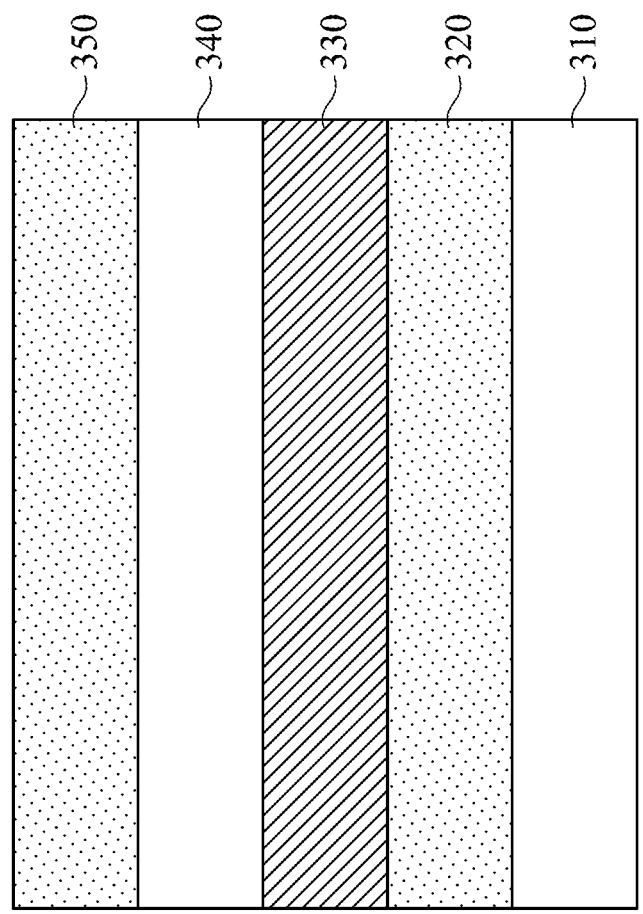
FIG. 5 is a schematic structural view of an organic light-emitting diode according to yet another embodiment of the present invention.

FIG. 5 is a schematic structural view of an organic light-emitting diode 300 according to an example of the present invention. The organic light-emitting diode 300 includes a substrate 310, a first electrode 320 disposed on the substrate 310, a hole transport layer 330 disposed on the first electrode 320, a light-emitting layer 340 disposed on the hole transport layer 330, and a second electrode 350 disposed on the light-emitting layer 340. In this example, the substrate 310 was a transparent substrate, and the material of which may be glass or plastic. The material of the first electrode 320 was indium tin oxide (ITO). The material of the hole transport layer 330 was the conjugated polymer of Embodiment 1 or Embodiment 2. The material of the light-emitting layer 340 was organic light-emitting material. The material of the second electrode 350 was aluminum. Since the material of the light-emitting layer 340 had an electron transporting property, the light-emitting layer 340 may also be used as an electron transport layer.

The conjugated polymers of Embodiment 1 and Embodiment 2 had good hole-transporting properties, and could be used as materials of a hole transport layer in an organic light-emitting diode.

Given the above, the conjugated polymer of the present invention includes side chains of a tertiary amine group or a quaternary ammonium salt group. When the conjugated polymer of the present invention includes the side chains of the tertiary amine group, the conjugated polymer has a good hole-transporting property and water/alcohol solubility. Hence, when fabricating a layered structure, problems of mutual dissolution between different layers can be prevented due to the immiscibility between water/alcohol and the organic solvent for materials in other layers. This conjugated polymer can be used as hole-transporting material. Moreover, since this kind of the conjugated polymer has a good hole-transporting property, it can also be used as a solid electrolyte. When the conjugated polymer of the present invention includes the side chains of the quaternary ammonium salt group, the conjugated polymer can be doped to have a good conductive property, and can be used as a conductive polymer. Besides, the conjugated polymer with the quaternary ammonium salt group can be used for the modification of ITO to reduce the work function of the ITO.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A conjugated polymer, having a structure of formula (I):

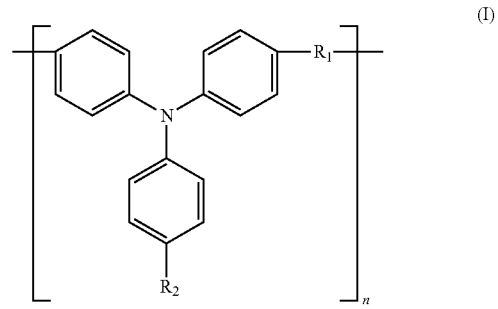

in formula (I), n is an integer greater than 10, wherein (i) $R_1$ is

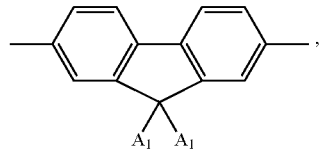

$R_2$ is

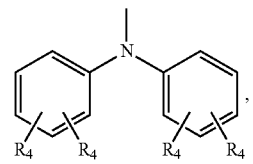

wherein $A_1$ is a functional group having

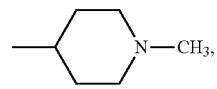

or a quaternary ammonium salt group, and $R_4$ is independently selected from fluorine, alkoxy, fluoroalkyl, or fluoroalkoxy, or (ii) $R_1$ is

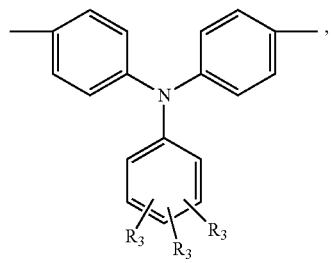

$R_2$ is $A_2$, wherein $R_3$ is independently selected from fluoroalkyl, $A_2$, or

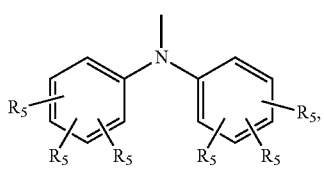

and $A_2$ is a functional group having

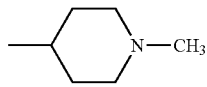

or a quaternary ammonium salt group, wherein $R_5$ is independently selected from alkoxy, or fluoroalkyl.

2. The conjugated polymer of claim 1, wherein $R_4$ is independently selected from fluorine, alkoxy of 1-12 carbon atoms, fluoroalkyl of 1-12 carbon atoms, or fluoroalkoxy of 1-12 carbon atoms.

3. A hole-transporting material, comprising a conjugated polymer having a structure of formula (I):

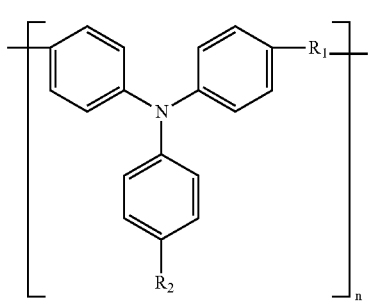 (I)

in formula (I), n is an integer greater than 10, wherein (i) $R_1$ is

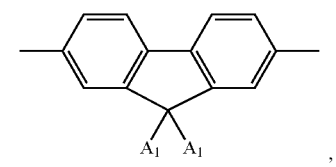

$R_2$ is

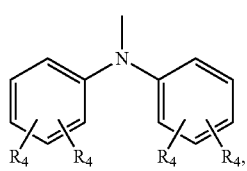

wherein $A_1$ is

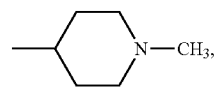

and $R_4$ is independently selected from fluorine, alkoxy of 1-12 carbon atoms, fluoroalkyl of 1-12 carbon atoms, or fluoroalkoxy of 1-12 carbon atoms, or (ii) $R_1$ is

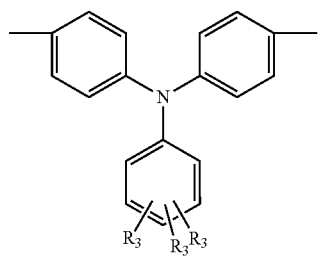

$R_2$ is $A_2$, wherein $R_3$ is independently selected from trifluoromethyl, $A_2$, or

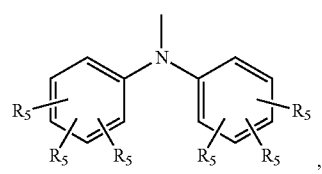

and $A_2$ is

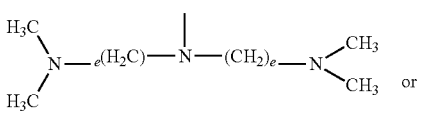

or

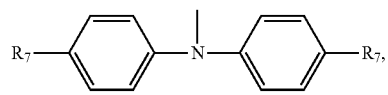

wherein e is 2 or 3, and $R_7$ is

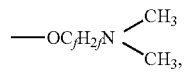

wherein f is 2 or 3, wherein $R_5$ is independently selected from alkoxy, or fluoroalkyl.

4. A solid electrolyte, comprising a conjugated polymer having a structure of formula (I):

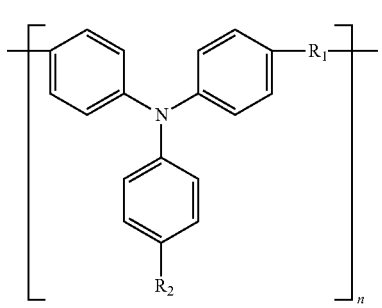

(I)

in formula (I), n is an integer greater than 10, wherein (i) $R_1$ is

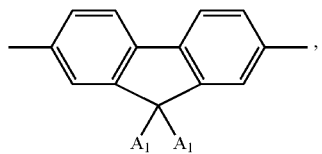

$R_2$ is

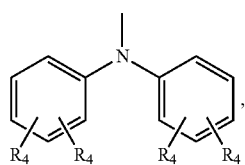

wherein $A_1$ is

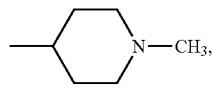

and $R_4$ is independently selected from fluorine, alkoxy of 1-12 carbon atoms, fluoroalkyl of 1-12 carbon atoms, or fluoroalkoxy of 1-12 carbon atoms, or (ii) $R_1$ is

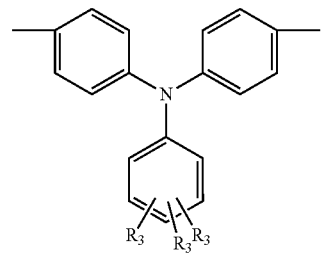

$R_2$ is $A_2$, wherein $R_3$ is independently selected from trifluoromethyl, $A_2$, or

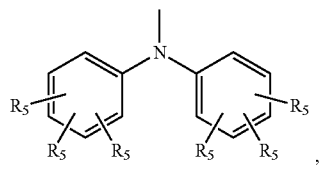

and $A_2$ is

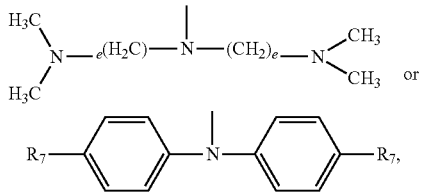

wherein e is 2 or 3, and $R_7$ is

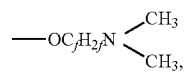

wherein f is 2 or 3, wherein $R_5$ is independently selected from alkoxy, or fluoroalkyl.

* * * * *